(12) United States Patent
Garcia et al.

(10) Patent No.: US 12,349,834 B2
(45) Date of Patent: Jul. 8, 2025

(54) CRISPING TRAYS FOR AIR-BASED COOKING DEVICES

(71) Applicant: Sensio Inc., New York, NY (US)

(72) Inventors: Jorge B. Garcia, Rogers, AR (US); Mark Fatouch, Montreal (CA)

(73) Assignee: Sensio Inc., New York, NY (US)

( * ) Notice: Subject to any disclaimer, the term of this patent is extended or adjusted under 35 U.S.C. 154(b) by 0 days.

(21) Appl. No.: 18/130,901

(22) Filed: Apr. 5, 2023

(65) Prior Publication Data

US 2023/0309742 A1   Oct. 5, 2023

Related U.S. Application Data

(60) Provisional application No. 63/327,718, filed on Apr. 5, 2022.

(51) Int. Cl.
*A47J 37/01* (2006.01)

(52) U.S. Cl.
CPC .................. *A47J 37/01* (2013.01)

(58) Field of Classification Search
CPC ....... A47J 37/01; A47J 37/0641; A47J 39/003
USPC ................. 220/573.1, 912; 99/444
See application file for complete search history.

(56) References Cited

U.S. PATENT DOCUMENTS

| | | | | |
|---|---|---|---|---|
| 676,479 | A | * | 6/1901 | Wagner ............... A47J 37/067 99/450 |
| 1,862,420 | A | * | 6/1932 | O'Brien ............... A47J 37/067 99/446 |
| 9,526,374 | B2 | | 12/2016 | Kim |
| 9,615,691 | B2 | | 4/2017 | Xiao |
| 9,888,811 | B2 | | 2/2018 | Zwanenburg et al. |
| 10,362,901 | B2 | | 7/2019 | Zwanenburg et al. |
| 10,390,656 | B2 | | 8/2019 | Gill et al. |
| 10,405,697 | B2 | | 9/2019 | Gill et al. |
| 10,405,698 | B2 | | 9/2019 | Gill et al. |
| 10,413,121 | B2 | | 9/2019 | Gill et al. |
| 10,413,122 | B2 | | 9/2019 | Gill et al. |
| 10,485,378 | B2 | | 11/2019 | Gill et al. |

(Continued)

FOREIGN PATENT DOCUMENTS

| CN | 110101316 A | 8/2019 |
|---|---|---|
| CN | 209712596 U | 12/2019 |

(Continued)

OTHER PUBLICATIONS

US 10,499,766 B2, 12/2019, Gill et al. (withdrawn)

(Continued)

*Primary Examiner* — Don M Anderson
*Assistant Examiner* — Elizabeth J Volz
(74) *Attorney, Agent, or Firm* — DLA Piper LLP (US)

(57) ABSTRACT

A support body positioned within a cooking cavity includes a support surface segmented into a series of inclined support surfaces. A side aperture is between each of the support surfaces. The support body includes a rim surrounding a perimeter of the support surface. In some embodiments, each inclined support surface includes a plurality of ribs. The plurality of ribs can include at least one of an arcuate shape or a linear shape. The plurality of ribs can be of varying lengths. Each of the plurality of ribs can include a respective elongated aperture generally aligned with a centerline or arc of the rib.

20 Claims, 11 Drawing Sheets

(56) References Cited

U.S. PATENT DOCUMENTS

| | | |
|---|---|---|
| 10,646,070 B2 | 5/2020 | Gill et al. |
| 10,653,270 B2 | 5/2020 | Gill et al. |
| 10,660,472 B2 | 5/2020 | Gill et al. |
| 10,674,868 B2 | 6/2020 | Gill et al. |
| 10,682,011 B2 | 6/2020 | Gill et al. |
| 11,033,146 B2 | 6/2021 | Anthony et al. |
| 11,051,654 B2 | 7/2021 | Anthony et al. |
| 11,147,415 B2 | 10/2021 | Anthony et al. |
| 2013/0276643 A1 | 10/2013 | Krolick et al. |
| 2014/0318386 A1 | 10/2014 | Kim |
| 2016/0120363 A1 | 5/2016 | Zwanenburg et al. |
| 2016/0174764 A1 | 6/2016 | Xiao |
| 2018/0228318 A1 | 8/2018 | Zwanenburg et al. |
| 2018/0353007 A1 | 12/2018 | Eberhart et al. |
| 2019/0045973 A1 | 2/2019 | Gill et al. |
| 2019/0231125 A1 | 8/2019 | Gill et al. |
| 2019/0231126 A1 | 8/2019 | Gill et al. |
| 2019/0231127 A1 | 8/2019 | Gill et al. |
| 2019/0231128 A1 | 8/2019 | Gill et al. |
| 2019/0231129 A1 | 8/2019 | Gill et al. |
| 2019/0231130 A1 | 8/2019 | Gill et al. |
| 2019/0231131 A1 | 8/2019 | Gill et al. |
| 2019/0231132 A1 | 8/2019 | Gill et al. |
| 2019/0231133 A1 | 8/2019 | Gill et al. |
| 2019/0231134 A1 | 8/2019 | Gill et al. |
| 2019/0231135 A1 | 8/2019 | Gill et al. |
| 2019/0231136 A1 | 8/2019 | Gill et al. |
| 2019/0231137 A1 | 8/2019 | Gill et al. |
| 2019/0231138 A1 | 8/2019 | Gill et al. |
| 2019/0231139 A1 | 8/2019 | Gill et al. |
| 2019/0231140 A1 | 8/2019 | Gill et al. |
| 2019/0231141 A1 | 8/2019 | Gill et al. |
| 2019/0231142 A1 | 8/2019 | Gill et al. |
| 2019/0231143 A1 | 8/2019 | Gill et al. |
| 2019/0254473 A1 | 8/2019 | Anthony et al. |
| 2019/0254474 A1 | 8/2019 | Anthony et al. |
| 2019/0254476 A1 | 8/2019 | Anthony et al. |
| 2019/0374064 A1 | 12/2019 | Gill et al. |
| 2019/0387923 A1 | 12/2019 | Anthony et al. |
| 2020/0060472 A1 | 2/2020 | Gill et al. |
| 2020/0060473 A1 | 2/2020 | Gill et al. |
| 2020/0069113 A1 | 3/2020 | Anthony et al. |
| 2020/0187712 A1 | 6/2020 | Gill et al. |
| 2020/0337497 A1 | 10/2020 | Anthony et al. |
| 2021/0045577 A1 | 2/2021 | Gill et al. |
| 2021/0076873 A1 | 3/2021 | Wei |
| 2021/0121006 A1 | 4/2021 | Gill et al. |
| 2021/0121007 A1 | 4/2021 | Gill et al. |
| 2021/0121008 A1 | 4/2021 | Gill et al. |
| 2021/0121009 A1 | 4/2021 | Gill et al. |
| 2021/0121010 A1 | 4/2021 | Gill et al. |

FOREIGN PATENT DOCUMENTS

| | | | |
|---|---|---|---|
| CN | 212117928 U | 12/2020 | |
| CN | 212698586 U | 3/2021 | |
| CN | 212912916 U | 4/2021 | |
| CN | 213850177 U | 8/2021 | |
| CN | 214595566 U | 11/2021 | |
| CN | 215650646 U | 1/2022 | |
| CN | 215914229 U | 3/2022 | |
| CN | 216907670 * | 7/2022 | ............ A47J 37/06 |
| WO | 2014/195150 A1 | 12/2014 | |
| WO | 2019/032876 A1 | 2/2019 | |
| WO | 2020/176492 A2 | 9/2020 | |
| WO | 2021/123277 A1 | 6/2021 | |

OTHER PUBLICATIONS

US 10,499,767 B2, 12/2019, Gill et al. (withdrawn)
US 10,537,207 B2, 01/2020, Gill et al. (withdrawn)
US 10,595,678 B2, 03/2020, Gill et al. (withdrawn)
US 10,595,679 B2, 03/2020, Gill et al. (withdrawn)
US 10,709,292 B2, 07/2020, Anthony et al. (withdrawn)
International Preliminary Report on Patentability issued Oct. 17, 2024, for corresponding International Application No. PCT/US2023/017498.
International Search Report and Written Opinion issued Jul. 20, 2023, for corresponding International Application No. PCT/US2023/017498.

* cited by examiner

CRISPING TRAYS FOR AIR-BASED COOKING DEVICES

CROSS-REFERENCE TO RELATED APPLICATIONS

This application claims priority to and the benefit of U.S. Provisional Patent Application No. 63/327,718, filed Apr. 5, 2022, the disclosure of which is incorporated by reference herein in its entirety.

BACKGROUND OF THE INVENTION

1. Field of the Invention

The present disclosure relates to air-based cooking devices and more particularly to crisping trays for use in air-based cooking devices, such as air-frying devices.

2. Description of Related Art

Air-based cooking devices, such as air-fryers, use hot air in order to heat and cook food. The devices typically heat and cook food by using convection currents circulated rapidly by a fan. A variety of air channeling accessories and sub-components are utilized in air-fryers in order to increase overall efficiency and/or cooking quality. These air channeling accessories and sub-components tend to reduce food item space. Moreover, these air-channeling accessories may have trouble passing the air from the bottom of a cooking surface, basket, or the like, to a cooking space due to the blockage caused by food items.

The conventional techniques have been considered satisfactory for their intended purpose. However, there is an ever present need for improved channeling of air while sacrificing little if any food item space. This disclosure provides a solution for this need.

SUMMARY OF THE INVENTION

A support body positioned within a cooking cavity includes a support surface segmented into a series of inclined support surfaces. A side aperture is between each of the support surfaces. The support body includes a rim surrounding a perimeter of the support surface.

The support body can include a central drain having a drain surface. The drain surface is at a vertical position below the support surface. The perimeter of the support body can be circular. Each inclined support surface can include a plurality of apertures. The plurality of apertures can be configured and adapted to guide airflow from a bottom side of the support body to a top side of the support body.

In some embodiments, each inclined support surface includes a plurality of ribs. The plurality of ribs can include at least one of an arcuate shape or a linear shape. The plurality of ribs can be of varying lengths. Each of the plurality of ribs can include a respective elongated aperture generally aligned with a centerline or arc of the rib. Each of the plurality of ribs can include a base portion extending upward from the support surface and a top surface raised relative to the base portion and support surface. Each of the plurality of ribs can include an elongated aperture defined in the top surface. A width of the base portion of each of the plurality of ribs can be wider than a width of each of the plurality of ribs. Each side aperture can be defined in a vertical step portion between a high-side of one of the inclined support surfaces and a low-side of an adjacent one of the inclined support surfaces.

In some embodiments, the rim includes at least one elongated rim aperture. The at least one elongated rim aperture is configured and adapted to guide airflow from a top side of the support body to a bottom side of the support body. The at least one elongated rim aperture can include a plurality of elongated rim apertures spaced apart about the perimeter of the support surface. The at least one elongated rim aperture can have at least one of an arcuate shape or a linear shape.

The support body can include at least one gutter positioned between adjacent inclined support surfaces. One of the at least one gutter can be at a vertical position below a respective one of the side apertures. Each of the at least one gutter can extend radially outward from a central drain to the perimeter of the support body.

In accordance with another aspect, an air-based fryer includes a housing defining a cooking cavity. The housing includes a bottom surface having a raised central portion. The air-based fryer includes a support body positioned within the cooking cavity. The support surface is segmented into a series of inclined support surfaces. The support body includes a side aperture between each of the support surfaces, and a rim surrounding a perimeter of the support surface.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
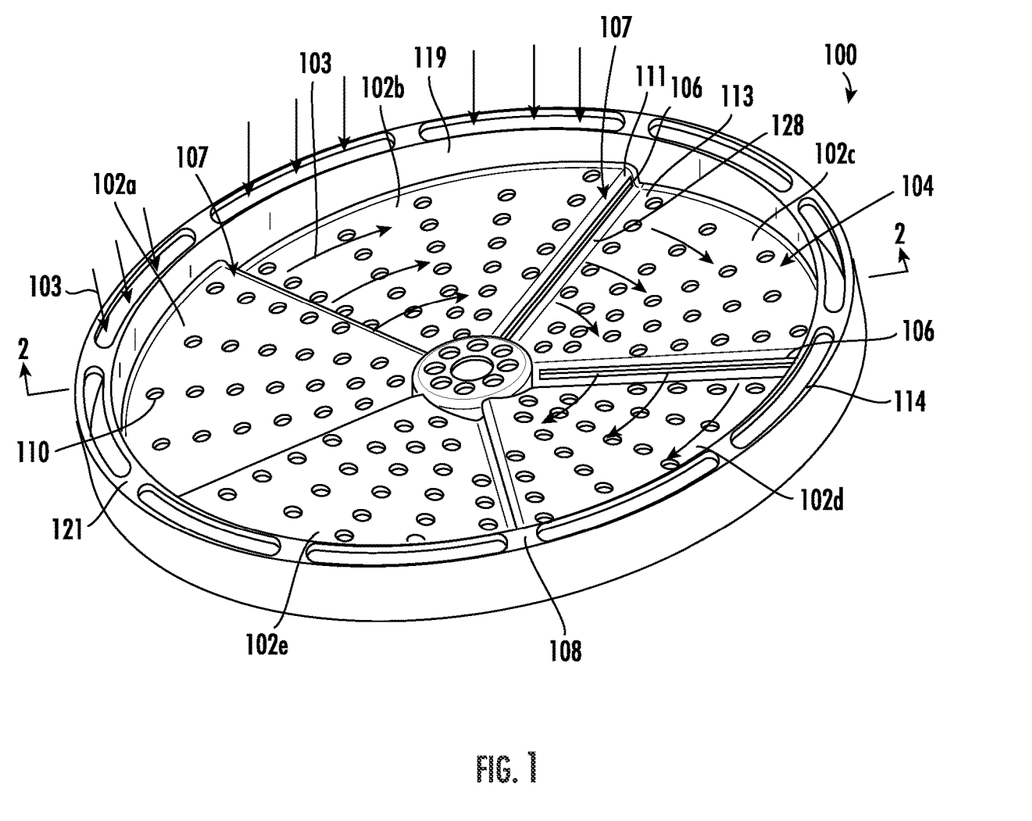
FIG. 1 is a perspective view of a support body constructed in accordance with an embodiment of the present disclosure, showing a series of inclined support surfaces with a side aperture between each inclined support surface.

Reference will now be made to the drawings wherein like reference numerals identify similar structural features or aspects of the subject disclosure. For purposes of explanation and illustration, and not limitation, a schematic view of an exemplary embodiment of a support body configured and adapted to be positioned within a cooking cavity of an air-based fryer in accordance with the disclosure is shown in FIG. 1 and is designated generally by reference character 100. Other embodiments of the support body in accordance with the disclosure, or aspects thereof, are provided in FIGS. 2-11 as will be described. The systems and methods described herein can be used to efficiently channel air in a cyclonic pattern without sacrificing food space while also providing fat removal from greasy foods, and air searing.

Figure 2:
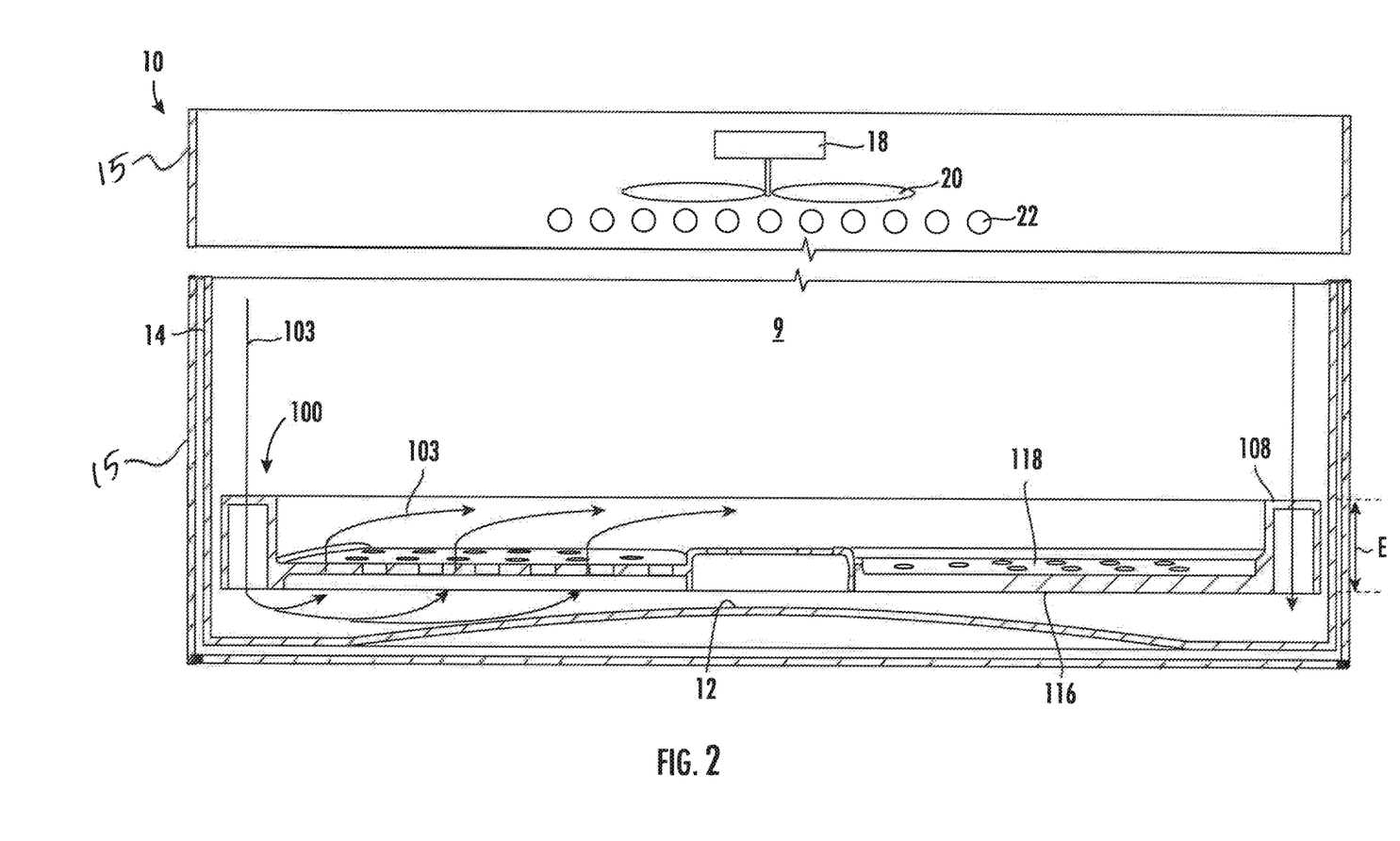
FIG. 2 is a side cross-sectional view of a portion of an air-fryer having the support body as shown in FIG. 1, showing air flow from a bottom side of the support surface to a top side of the support surface.
Figure 8:
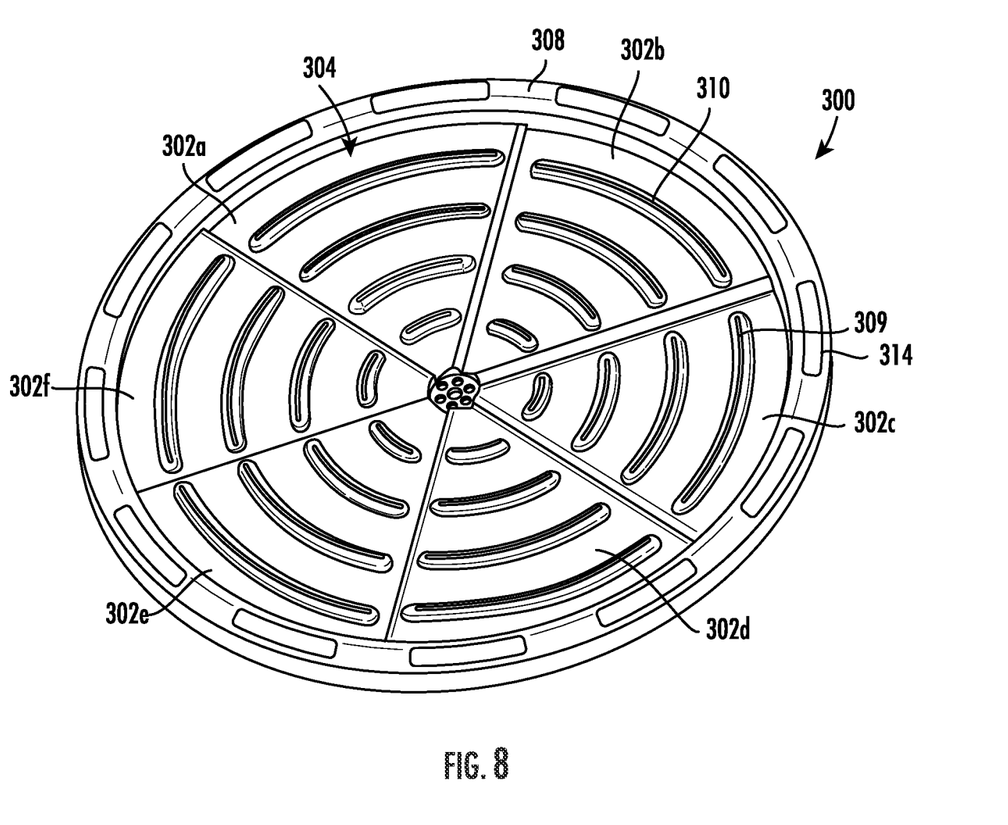
FIG. 8 is a perspective view of a support body constructed in accordance with another embodiment of the present disclosure, showing six inclined support surfaces.

As shown in FIGS. 1-2, a circular aluminum support body 100 is configured and adapted to be positioned within a cooking cavity 9 of an air fryer 10. Air fryer 10 includes a motor 18 and a fan 20. Fan 20 is operatively coupled to motor 18 to be driven by motor 18. An electronically powered heating coil 22 is positioned below fan 20 such that airflow generated by the fan 20 is driven over the heating coil 22 and heated. The heated airflow, schematically shown by the arrows 103, is driven downward towards the bottom of cooking cavity 9 where support body 100 is positioned. Air fryer 10 is defined at least in part by a housing 14. Housing 14 can be a removable basket, drawer, stationary cavity, or the like. In embodiments where housing 14 is a removable basket, drawer or the like, air fryer 10 includes an outer shell 15 or outer housing to which motor 18 is coupled to. Housing 14 includes a raised central portion 12 on the bottom of housing 14 of air fryer 10. Support body 100 includes a support surface 104 segmented into a series of inclined support surfaces 102a-102e. The embodiment of FIGS. 1-2 includes five inclined segments, each forming a respective inclined support surface 102a-102e. Those skilled in the art, however, will readily appreciate that embodiments of this disclosure may include more or less than five segments, e.g., support body 300 as shown in FIG. 8 having six segments. Inclined support surfaces 102a-102e repeat the same inclined pattern. The incline of each support surface 102a-102e has the same slope around a curved guideline. This repeated inclined pattern is responsible for the creation of the cyclonic effect as well as the air searing technology. Searing will be achieved because the horizontal air flow will allow air to flow over the comestible product (e.g., steak, chicken, other meats or other foods) blanketing the comestible product with hot air which will sear the juices in. Each inclined support surface 102a-102e includes a plurality of surface apertures 110. Support body 100 includes side apertures 106 are defined in each vertical step portion 107 at an end of each inclined support surfaces 102a-102e between a high-side 111 of one of the inclined support surfaces 102a-102e and a low-side 113 of an adjacent one of the inclined support surfaces. Vertical step portion 107 is a wall that extends vertically from low-side 113 of one of the inclined supports surfaces 102a-102e to high side 111 of an adjacent inclined support surface.

With continued reference to FIGS. 1-2, support body 100 includes a rim 108 surrounding a perimeter of support surface 104. The rim 108 includes a plurality of elongated rim apertures 114 defined in a top surface 121, e.g. an intake surface, of the rim 108. In the embodiment of FIG. 1, intake surface 121 is composed of ten rim apertures 114 measuring 4.5 cm and aligned with the circular edges of the elevated platform. Elongated rim apertures 114 are spaced apart about the perimeter of support surface 104 and have an arcuate shape. Those skilled in the art will readily appreciate that support body 100 can include more or less than ten rim apertures 114. Moreover, the rim apertures may have a variety of suitable shapes and dimensions and may present different measurements than the embodiment of FIG. 1. The vertical elevation E of the apertures 114 from the bottom of support body 100 is about 1.6 cm in some embodiments, but may vary depending on shape and size of support body 100, e.g., square versus round, or 3 qt. versus 6 quart.

As shown in FIGS. 1-2, the rim 108 is elevated relative to support surface 104 and surrounds a perimeter of support surface 104. The elevation of rim 108 relative to support surface 104 acts to create a boundary (defined by an inner diameter surface 119 of the rim 108) to direct a user to place their food on support surface 104 and not on the sides containing rim apertures 114. This boundary helps to ensure that airflow can pass to from a top side 118 of support surface 104 to a bottom side 116 of support surface 104 through rim apertures 114. Those skilled in the art will readily appreciate that the dimensions may be modified as needed to provide the air a chance to flow down the apertures 114 with little to no inference when cooking non-stacked food items such as, and not limited to, burger patties, chicken wings and chicken breasts.

With continued reference to FIGS. 1-2, elongated rim apertures 114 are configured and adapted to guide a heated airflow, shown schematically with arrows 103 in FIGS. 1 and 2, from top side 118 of the support body 100 to bottom side 116 of support body 100. When the air flows down through the elongated rim apertures 114, the air flow passes by raised central portion 12 with a convex curved shape on the bottom of housing 14, driving the air to bottom side 116 of support body 100 and upward through apertures 106. The curved central portion 12 acts to improve upward airflow. As the air exits side apertures 106 on top side 118 of support body 100 the airflow rotates (also shown schematically with arrows 103) and creates a cyclonic air flow within the air fryer cooking cavity 9 insuring an even heat dispersion throughout the cavity 9. The cross-sectional flow area defined through elongated rim apertures 114 is larger than the cross-sectional flow area defined through side apertures 106 at the output. This converging cross-sectional flow area increases the velocity of airflow thereby improving the heat transfer between the airflow and support body 100. Those skilled in the art will readily appreciate that the cross-sectional flow area defined through elongated rim apertures 114 can be smaller or equal to the output, but that would affect the velocity of the outputted airflow resulting in a lower heat transfer.

Figure 9:
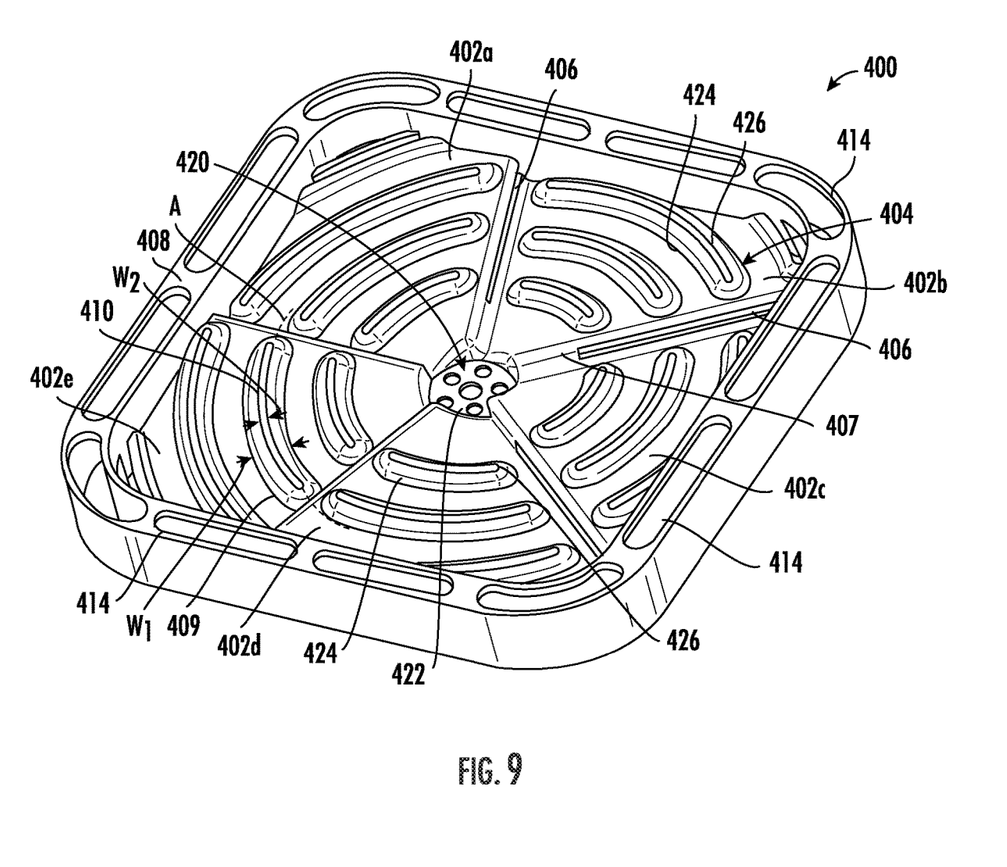
FIG. 9 is a perspective view of a support body constructed in accordance with another embodiment of the present disclosure, showing a support body having a square shape with rounded corners.

With continued reference to FIGS. 1-2, side apertures 106 diffuse the air sideways and generate a cyclonic airflow pattern as well as help reduce air circulation blockage that the food causes on surface apertures 110 of support surface 104. This is an improvement over traditional air fryers, as the side apertures 106 enable the air to pass through an additional opening that may not be blocked by the food items and create a cyclonic pattern, but also lets the airflow surround the food with hot air causing a sear that provides better moisture retention and cooking evenness. Embodiments of the present disclosure are also able to generate this cyclonic airflow while still maximizing the available cooking volume, compared with traditional air-based cooking devices. In some embodiments, elongated side aperture 106 may include a plurality of side apertures, such as circular perforations, or any other suitable arrangement of side apertures that enable the air to flow from bottom side 116 of support surface 104 to top side 118 of support surface 104 creating the cyclonic effect. Those skilled in the art will readily appreciate that support body 100 may also be formed in different shapes (such as a square as shown in FIG. 9) depending on the air fryer shape or cooking container shape.

With continued reference to FIG. 1, during use, the surface apertures 110 may be covered by the food being cooked. This creates a resistance and directs the air to travel through the path with least restriction, which is through side apertures 106. This increases the airflow and speed of airflow through side apertures 106, and helps create a sear in foods to trap moisture and create more even cooking. Embodiments of the present invention provide a low-cost solution for increasing cooking evenness, reducing cooking time, increasing cooking capacity and better fat drainage away from the cooked goods.

In accordance with the embodiment of FIGS. 3-7, a support body 200 is shown. Support body 200 is similar to support body 100 except that support body 200 includes a plurality of ribs 209 with elongated apertures 210 defined therein, instead of apertures 110 defined in inclined support surfaces 102a-102e. Support body 200 is configured and adapted to be positioned within a cooking cavity, similar to cooking cavity 9. Support body 200 includes a support surface 204 segmented into a series of inclined support surfaces 202a-202e, similar to inclined support surfaces 102a-102e described above. Each inclined support surface 202a-202e of the support surface 204 is characterized by a repeated inclined pattern, similar to that described above for each inclined support surface 102a-102e. Side apertures 206 are defined in respective vertical step portions 207 at an end of each of support surfaces 202a-202e, similar to side apertures 106, described above. The cyclonic airflow pattern is caused by the side apertures 206 positioned on the elevated side each inclined support surface 202a-202e. The airflow through side apertures 206 is enhanced when the elongated apertures 210 are covered, as the air is forced to increase in speed and helps create a sear in foods to trap moisture and create more even cooking. Instead of a single elongated side aperture 206 on each vertical step portion 207, the side aperture may include a plurality of side apertures, such as circular perforations, similar to that described above for side aperture 106.

Figure 3:
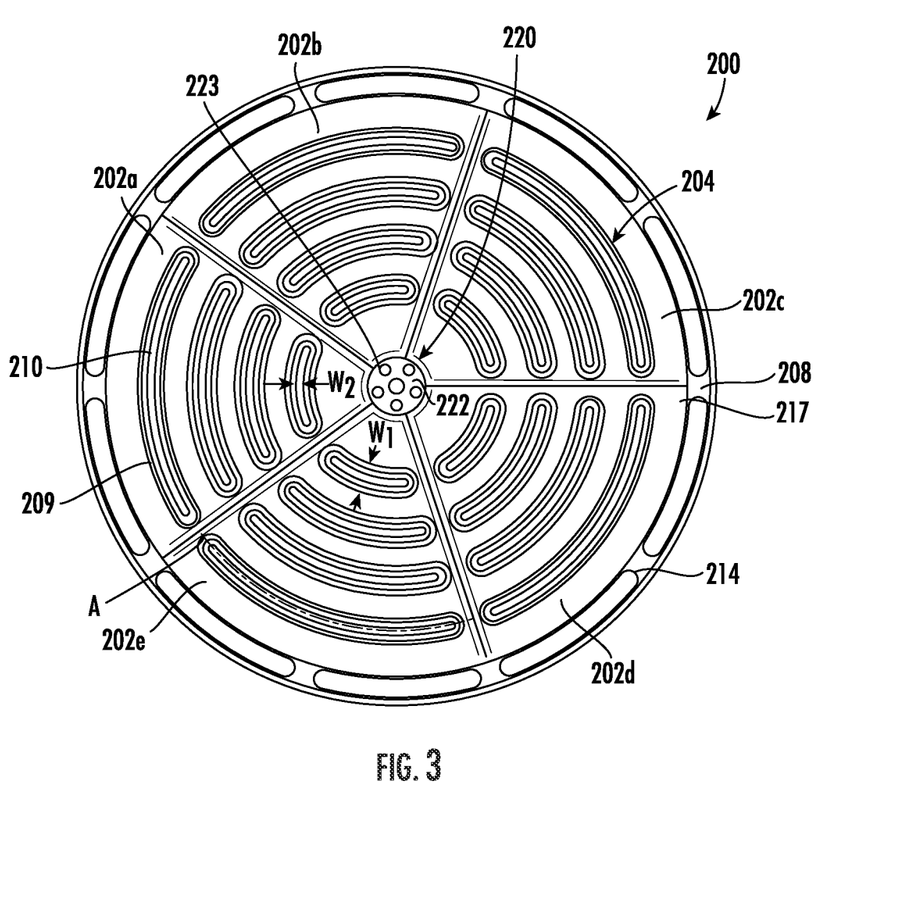
FIG. 3 is a top plan view of a support body constructed in accordance with another embodiment of the present disclosure, showing a series of inclined support surfaces with a side aperture between each inclined support surface and with ribs formed on the support surface.
Figure 4:
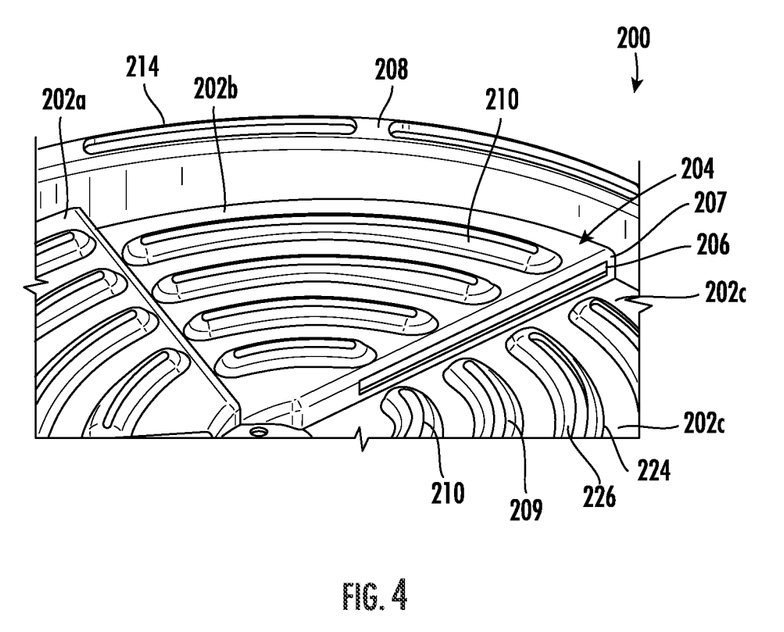
FIG. 4 is a top perspective view of a portion of the support body as shown in FIG. 3, showing elongated apertures defined in the ribs.

As shown in FIGS. 3-4, the primary difference between support body 200 and support body 100 is that each inclined support surface 206a-206e includes ribs 209. Each rib 209 has an arcuate shape. Those skilled in the art will readily appreciate that ribs with a linear shape can also be used and/or that the number of ribs (and their associated apertures) may vary depending on the application and the shape of the support body. Ribs 209 are of varying lengths. Each rib 209 includes a respective elongated aperture 210 generally aligned with a centerline A or arc of its respective rib 209. Each rib 209 includes a base portion 224 extending upward from its respective support surface 202a-202e and a top surface 226 raised relative to base portion 224 and its respective support surface 206a-206e. A width $W_1$ of base portion 224 of each rib 209 is wider than a width $W_2$ of its corresponding elongated aperture 210.

Figure 5:
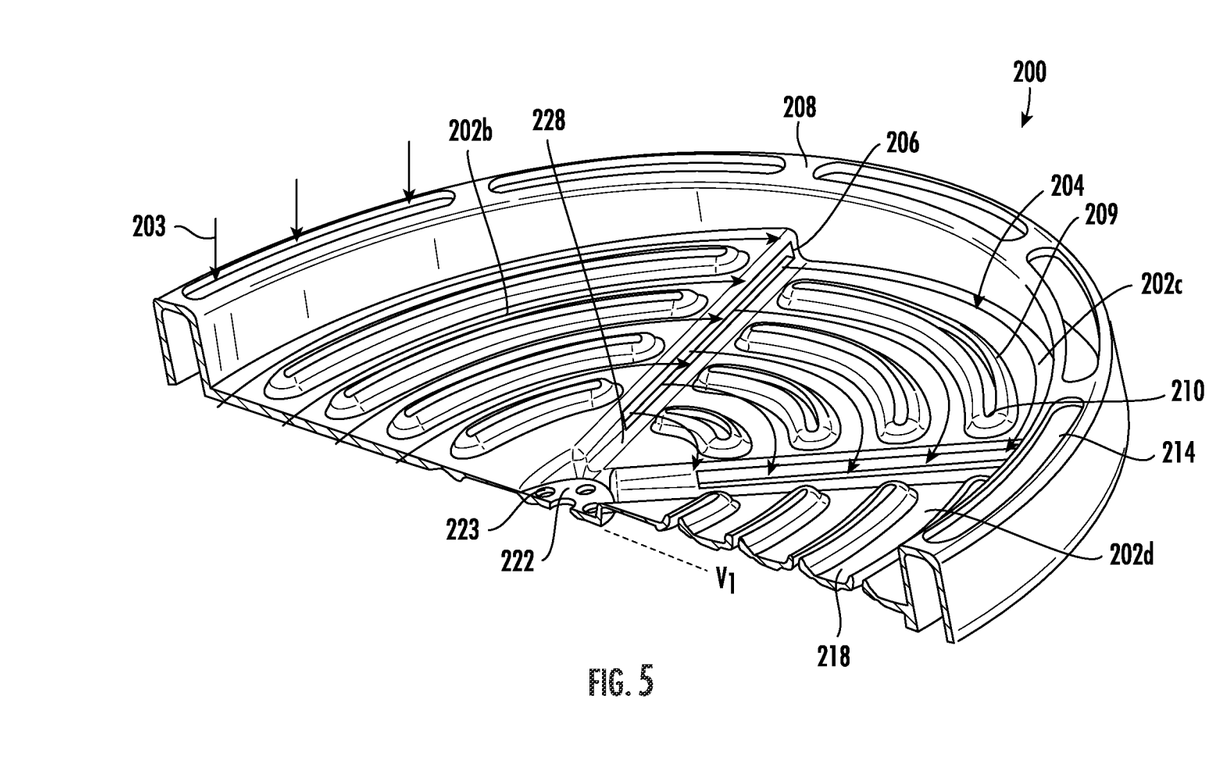
FIG. 5 is a top perspective view of a portion of the support body as shown in FIG. 3, showing cyclonic airflow along the ribs.
Figure 6:
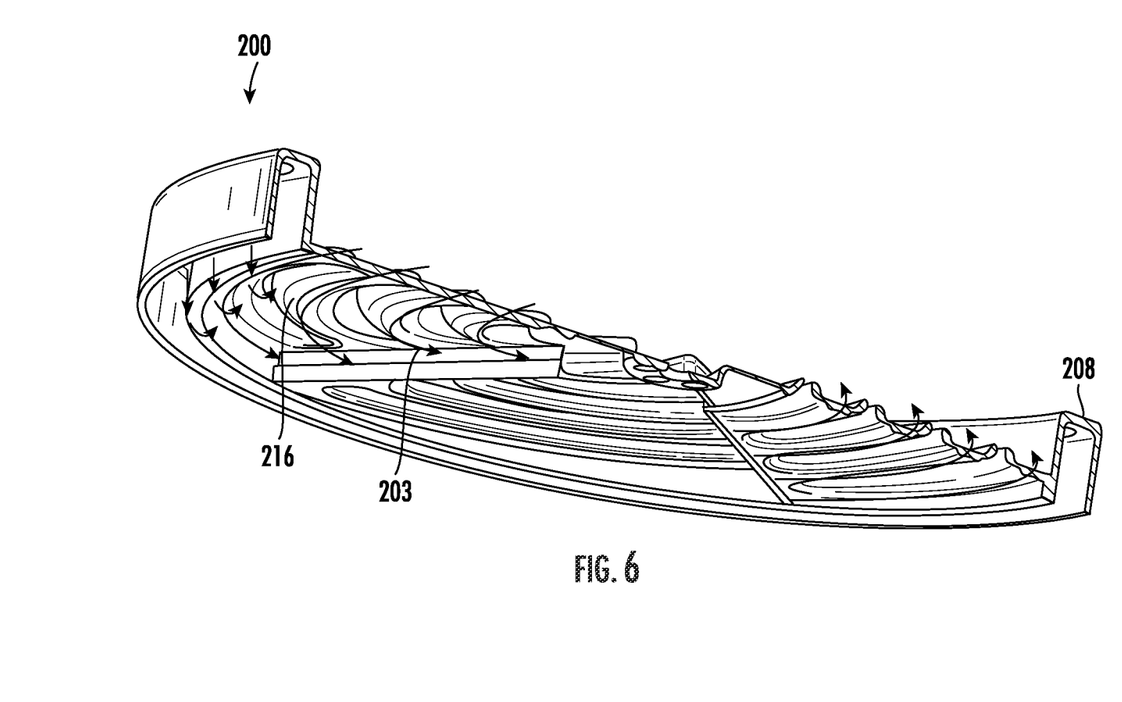
FIG. 6 is a bottom perspective view of a portion of the support body as shown in FIG. 3, showing cyclonic airflow along a bottom side of the support body.
Figure 7:
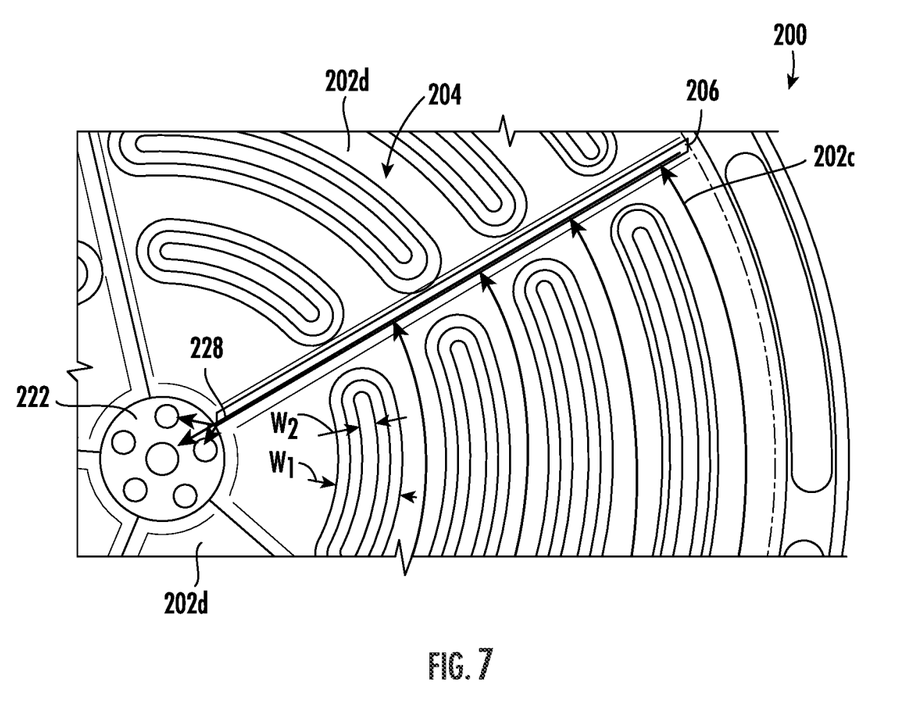
FIG. 7 is a top plan view of a portion of the support body as shown in FIG. 3, showing the central drain having a drain surface.

With reference now to FIGS. 5-6, the plurality of apertures 210 are configured and adapted to guide airflow from a bottom side 216 of the support body 200 to a top side 218 of the support body 200. This air flow through apertures 210 allows for the air searing. Searing (e.g., the "Maillard" reaction) acts to brown food, commonly meat, and encases the juices in meats while leaving grilling marks on the food items. Each rib 209 converges from the bottom side 216 of the support body, where base portion 224 begins, to top side 218 of support body where elongate aperture 210 is formed. This causes air to accumulate on bottom side 216 under each rib 209 and increase in velocity as it converges to elongated aperture 210. This increased velocity results in increased local temperature, thereby favoring heat transfer to a food product that may be on support surface 204 and creating a noticeable searing mark(s) caused by the hot air from apertures 210 (not the conductive heat from support body 200).

As shown in FIGS. 5-6, support body 200 includes a rim 208 surrounding a perimeter of support surface 204. Rim 208 is similar to rim 108 and includes a plurality of elongated rim apertures 214, similar to elongated rim apertures 114. Elongated rim apertures 214 are configured and adapted to guide airflow (shown schematically by arrows 203) from a top side 218 of support body 200 to a bottom side 216 of support body 200. Elongated rim apertures 214 are spaced apart about the perimeter of the support surface and have an arcuate shape.

With continued reference to FIGS. 5-6, support body 200 includes a central drain 220 having a drain surface 222. Drain surface 222 defines drain holes 223 and is at a vertical position Vi below support surface 204. Central drain 220 functions to drain the fats and oils that get rendered from the food items. Side apertures 206 measure 5.8 cm by 0.2 cm and are slightly elevated by a height of 0.2 cm. That height is allows space for a gutter 228. Gutter 228 guides rendered fats to drain 220. The height from the bottom of the segment to the lower side of side aperture 206 may vary. Gutters 228 all end up directing liquid flow into drain 220 and through drain holes 223. For drain 220 to function properly, a bump on the bottom of the air fryer, e.g. raised central portion 12 shown in FIG. 2, acts to restrict the airflow from coming out of drain holes 223 so that the liquid flow, e.g. the fat or grease, can easily drip down through drain holes 223 and accumulate at the bottom of the cooking cavity, e.g. cooking cavity 9. While embodiments of the present disclosure are shown and described with the housing/basket 14 having a bottom with raised central portion 12, it is also contemplated that a housing/basket 14 with a flat bottom can be used.

The embodiment of FIGS. 3-7 offers air searing, cyclonic airflow generation and fat draining. Those skilled in the art, however, will readily appreciate that in some embodiments, it is possible to only offer one or two of the discloses advantages. As shown in FIGS. 1-2, the support body 100 provides cyclonic air flow and fat-draining, but does not include ribs, e.g. ribs 209. Therefore, it is possible to have a variety of embodiments, each one offering more or less of the previously defined features. Those skilled in the art will readily appreciate that the perimeters of the support bodies 100 and 200 are circular, but could be a variety of suitable shapes depending on the air fryer shape or cooking cavity shape. Moreover, support bodies 100 and 200 each include five inclined support surfaces. Those skilled in the art, however, will readily appreciate that embodiments of this disclosure may include more or less than five inclined support surfaces, e.g., support body 300, as shown in FIG. 8, having six inclined support surfaces 302a-302f.

As shown in FIG. 9, a support body 400 is shown. Support body 400 is similar to support body 200 except that support body 400 has a perimeter square shape with rounded corners. Support body 400 includes ribs 409 with elongated apertures 410 defined therein, similar to ribs 209 and apertures 210. The support body 400 is configured and adapted to be positioned within a cooking cavity, similar to cooking cavity 9. Support body 400 includes a support surface 404 segmented into a series of inclined support surfaces 402a-402e. A side aperture 406, similar to side aperture 206, is defined in a vertical step portion 407 at an end of each support surface 402a-402e. Step portion 407 is similar to step portions 107 and 207. Support body 400 includes a rim 408, similar to rim 208, surrounding a perimeter of support surface 404. Support body 400 includes a central drain 420 having a drain surface 422, similar to drain 220 and drain surface 222. Drain surface 422 is at a vertical position below support surface 404.

With continued reference to FIG. 9, each inclined support surface 406a-406e includes a set of ribs 409. Each rib 409 has an arcuate shape. Those skilled in the art will readily appreciate that ribs with a linear shape can also be used. The ribs 409 are of varying lengths. Each rib aperture 410 is generally aligned with a centerline arc A of its respective rib 409, similar to aperture 210. Each rib 409 includes a base portion 424 extending upward from support surface 404 and a top surface 426 raised relative to base portion 424 and support surface 404. A width $W_1$ of base portion 424 of each rib 409 is wider than a width $W_2$ of each elongated aperture 410.

Figure 10:
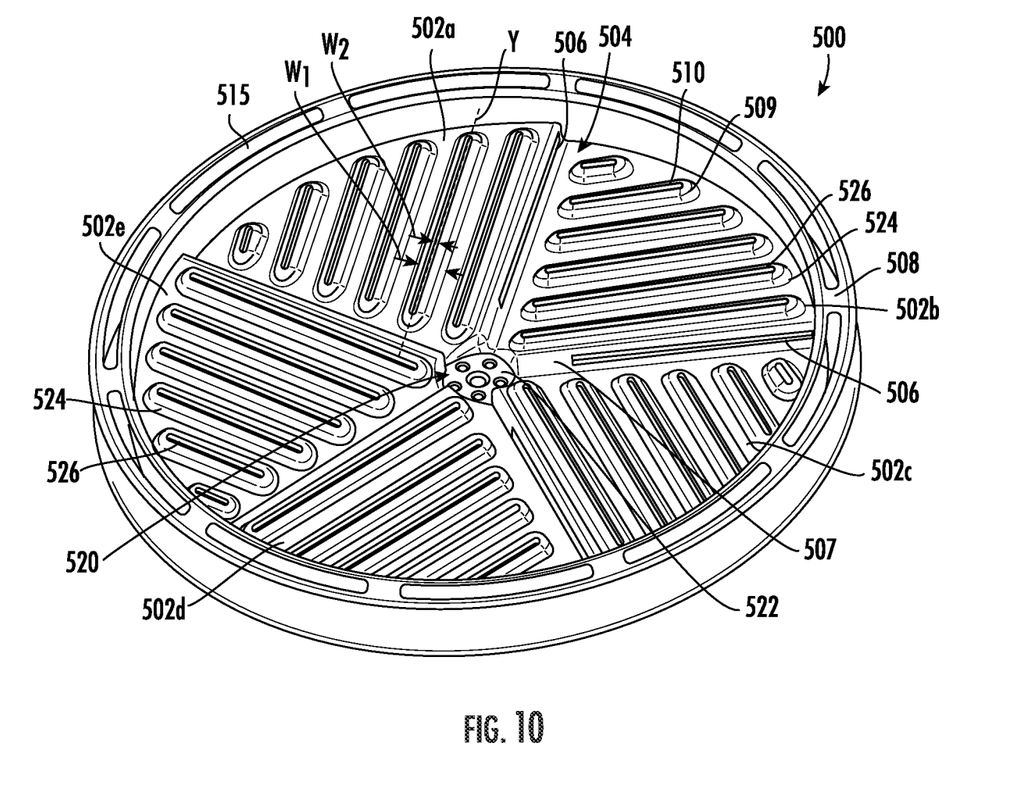
FIG. 10 is a perspective view of a support body constructed in accordance with another embodiment of the present disclosure, showing linear ribs on the support surface.

As shown in FIG. 10, a support body 500 is shown. Support body 500 is similar to support body 200 except that support body 500 includes a plurality of linearly shaped ribs 509 with elongated apertures 510 defined therein, instead of arcuate ribs 209. The support body 500 is configured and adapted to be positioned within a cooking cavity, similar to cooking cavity 9. Support body 500 includes a support surface 504 segmented into a series of inclined support surfaces 502a-502e. A side aperture 506, similar to side aperture 206, is defined in a vertical step portion 507 at an end of each support surface 502a-502e, Step portion 507 is similar to step portions 107 and 207. Support body 500 includes a rim 508, similar to rim 508, surrounding a perimeter of support surface 504. Support body 500 includes a central drain 520 having a drain surface 522, similar to drain 220 and drain surface 222. Drain surface 522 is at a vertical position below support surface 504.

With continued reference to FIG. 10, each inclined support surface 502a-502e includes a set of ribs 509. Each rib 409 has a linear shape, but otherwise has the same functionality of ribs 209 as described above. The ribs 509 are of varying lengths. Each rib aperture 510 is generally aligned with a centerline axis Y of its respective rib 509. Each rib 409 includes a base portion 524 extending upward from support surface 504 and a top surface 526 raised relative to base portion 524 and support surface 504. A width $W_1$ of base portion 524 of each rib 509 is wider than a width $W_2$ of each elongated aperture 510.

Figure 11:
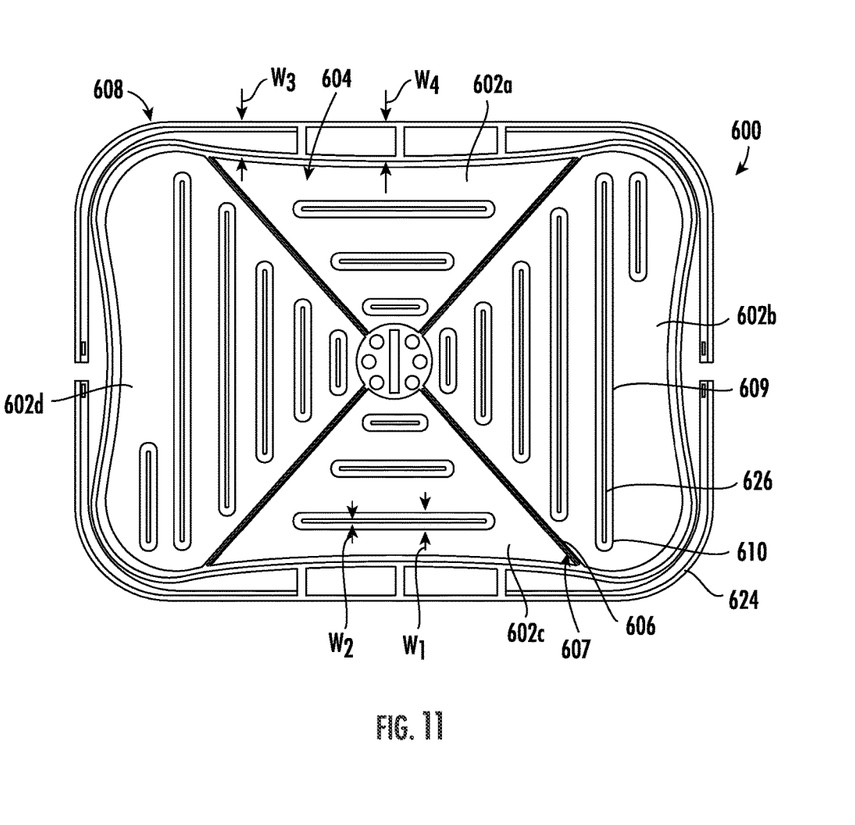
FIG. 11 is a perspective view of a support body constructed in accordance with another embodiment of the present disclosure, showing a support body having a rectangular shape and linear ribs on the support surface.

With reference now to FIG. 11, a support body 600 is shown. Support body 600 is similar to support body 500 except that support body 600 has a generally rectangular perimeter with rounded corners and a continuous rim aperture 614. Support body 600 is similar to support body 200 in that support body 600 includes a plurality of linearly shaped ribs 609 with elongated apertures 610 defined therein. Support body 600 is configured and adapted to be positioned within a cooking cavity, similar to cooking cavity 9. Support body 600 includes a support surface 604 segmented into a series of four inclined support surfaces 602a-602d. A side aperture 606 is defined in each respective step portion 607 at an end of each of the support surfaces 602a-602d. Step portion 607 is similar to step portions 107 and 207. The support body 600 includes a rim 608 with continuous rim aperture 614. Rim aperture 614 acts as an intake section for air blowing downward from a fan of an air fryer, such as a fan 20, similar to rim apertures 214. This intake section or rim aperture 614 can be optimized by not having a uniform opening width. Rim aperture 614 as a first width $W_3$ that is smaller than a second width $W_4$ of the rim aperture. This larger width $W_4$ permits increased airflow to be directed downwards to a bottom side of the support body and then inwards towards the center of support body 600. Support body 600 includes a central drain 620 having a drain surface 622. The drain 620 and drain surface 622 are similar to drain 220 and drain surface 222.

With continued reference to FIG. 11, each rib 609 has a linear shape, but otherwise has the same functionality of ribs 209 as described above. Each rib 609 includes a base portion 624 extending upward from support surface 604 and a top surface 626 raised relative to base portion 624 and support surface 604. A width $W_1$ of base portion 624 of each rib 609 is wider than a width $W_2$ of each elongated aperture 610.

Those skilled in the art will readily appreciate that support bodies 100, 200, 300, 400, 500 and 600 are formed using a dies and punches, or other suitable manufacturing techniques. The overall thickness of the material forming the support bodies 100, 200, 300, 400, 500 and 600 is approximately 0.1 cm, or any other suitable thickness. The methods and systems of the present disclosure, as described above and shown in the drawings, provide for improved crisping trays with superior properties including simultaneously guiding the air in a cyclonic pattern, creating a unique air sear, and disposing of fats and oils away from the food. In contrast, traditional air-cooking components or accessories require complicated assemblies to boost the efficiency by increased airflow of the unit or to create searing marks. The systems and methods of the present invention can apply to air fryers, or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A support body configured and adapted to be positioned within a cooking cavity of an air-based fryer, the support body comprising:
 a support surface segmented into a series of inclined support surfaces;
 a rim surrounding a perimeter of the support surface; and
 a plurality of side apertures positioned in a vertical step portion between each of the inclined support surfaces, the plurality of side apertures extending in a radial direction from a center portion of the support surface towards the rim and oriented in a common direction tangential to the radial direction, wherein each of the plurality of side apertures is positioned in the vertical step portion between a high-side of one of the inclined support surfaces and a low-side of an adjacent one of the inclined support surfaces.

2. The support body as recited in claim 1, further comprising a central drain having a drain surface, wherein the drain surface is at a vertical position below the support surface.

3. The support body as recited in claim 1, wherein each inclined support surface includes a plurality of apertures.

4. The support body as recited in claim 3, wherein the plurality of apertures are configured and adapted to guide airflow from a bottom side of the support body to a top side of the support body.

5. The support body as recited in claim 1, wherein each inclined support surface includes a plurality of ribs.

6. The support body as recited in claim 5, wherein the plurality of ribs includes at least one of an arcuate shape or a linear shape.

7. The support body as recited in claim 5, wherein the plurality of ribs are of varying lengths.

8. The support body as recited in claim 5, wherein each of the plurality of ribs includes a respective elongated aperture generally aligned with a centerline or arc of the rib.

9. The support body as recited in claim 5, wherein each of the plurality of ribs includes a base portion extending upward from the support surface and a top surface raised relative to the base portion and support surface.

10. The support body as recited in claim 9, wherein each of the plurality of ribs includes an elongated aperture defined in the top surface.

11. The support body as recited in claim 9, wherein a width of the base portion of each of the plurality of ribs is wider than a width of each of the plurality of ribs.

12. The support body as recited in claim 1, further comprising at least one gutter positioned between adjacent inclined support surfaces.

13. The support body as recited in claim 12, wherein one of the at least one gutter is at a vertical position below a respective one of the plurality of side apertures.

14. The support body as recited in claim 12, wherein each of the at least one gutter extends radially outward from a central drain to the perimeter of the support body.

15. The support body as recited in claim 1, wherein the perimeter of the support body is circular.

16. A support body configured and adapted to be positioned within a cooking cavity of an air-based fryer, the support body comprising:

a support surface segmented into a series of inclined support surfaces;

a rim surrounding a perimeter of the support surface; and a plurality of side apertures positioned in a vertical step portion between each of the inclined support surfaces, the plurality of side apertures extending in a radial direction from a center portion of the support surface towards the rim and oriented in a common direction tangential to the radial direction, wherein the rim includes at least one elongated rim aperture.

17. The support body as recited in claim 16, wherein the at least one elongated rim aperture is configured and adapted to guide airflow from a top side of the support body to a bottom side of the support body.

18. The support body as recited in claim 16, wherein the at least one elongated rim aperture includes a plurality of elongated rim apertures spaced apart about the perimeter of the support surface.

19. The support body as recited in claim 16, wherein the at least one elongated rim aperture has at least one of an arcuate shape or a linear shape.

20. An air-based fryer comprising:

a housing defining a cooking cavity, wherein the housing includes a bottom surface having a raised central portion; and a support body positioned within the cooking cavity, wherein the support body comprises:

a support surface segmented into a series of inclined support surfaces, a rim surrounding a perimeter of the support surface, and a plurality of side apertures positioned in a vertical step portion between each of the inclined support surfaces, the plurality of side apertures extending in a radial direction from a center portion of the support surface towards the rim and oriented in a common direction tangential to the radial direction.

* * * * *